United States Patent [19]

Loeb et al.

[11] Patent Number: 4,890,240
[45] Date of Patent: Dec. 26, 1989

[54] COALESCING CHANGES IN PATTERN-DIRECTED, RULE-BASED ARTIFICIAL INTELLIGENCE PRODUCTION SYSTEMS

[75] Inventors: David J. Loeb, Campbell, Calif.; Keith R. Milliken, Croton Falls, N.Y.

[73] Assignee: International Business Machines Corporation, Armonk, N.Y.

[21] Appl. No.: 247,037

[22] Filed: Sep. 20, 1988

[51] Int. Cl.⁴ .............................................. G06F 15/18
[52] U.S. Cl. .................................... 364/513; 364/300; 364/200; 364/274.5; 364/274.7
[58] Field of Search ................. 364/200, 900, 300, 513

[56] References Cited

PUBLICATIONS

Programming Expert Systems in OPS5, An Introduction to Rule-Based Programming, Lee Brownston, et al, 1985.
A New and Efficient Match Algorithm for AI Productions Systems, by Daniel Paul Miranker, Jan., 1987.
OPS 5 User's Manual, Jul. 1981, Charles L. Forgy, Department of Computer Science, Carnegie-Mellon University.
Artificial Intelligence RETE: A Fast Algorithm for the Many Pattern/Many Object Pattern Match Problem, Charles L. Forgy, 1982.
Chapter from Distributed Computing, Academic Press, 1984, pp. 10-19, Chambers et al.
Aho et al., "Compilers: Principles, Techniques, and Tools", Addison-Wesley Publishing Co., copyright 1986, pp. 608-632.
Chapter from Introduction to Expert Systems, Additons-Wesley, 1986, pp. 29-51, 126-141, Peter Jackson.
Advances in RETE Pattern Matching, Marshall I. Schor et al, pp. 226-232, Proceedings of AAAI, 1986.

Primary Examiner—Allen MacDonald
Attorney, Agent, or Firm—Baker, Maxham, Jester & Meador

[57] ABSTRACT

A technique for collecting changes to working memory objects made by rule execution in an artificial intelligence production system avoids frequent use of a matching algorithm by delaying the match processing of the collected changes to a memory object until completion of an executing rule. A change to an object wrought by execution of a rule is signified in a control block for that object. Once a first change has occurred, subsequent changes caused before execution of the rule is complete will be made to the object and indicated by the change block. When execution of the rule is complete, the changes coalesced in the object itself are registered in the system by introduction of the changed object into the matching algorithm. This avoids match processing the object each time it is changed during execution of the rule.

8 Claims, 3 Drawing Sheets

COALESCING CHANGES IN PATTERN-DIRECTED, RULE-BASED ARTIFICIAL INTELLIGENCE PRODUCTION SYSTEMS

BACKGROUND OF THE INVENTION

This invention relates to artificial intelligence production systems, and more particularly, to a method for uniting a sequence of changes to working memory objects of such a system, while deferring matching of the working memory to system rules.

Rule-based artificial intelligence production systems signify computer programs written in a production system language. A production system generally includes working memory including a set of elements, a set of rules defined in terms of the elements, and a control mechanism, or inference engine, which executes the rules with reference to the elements. The control mechanism matches the rules with the elements to produce a conflict set consisting of rules associated with matched elements. The control mechanism resolves the conflict set by selecting the order with which the rules are executed, and "fires" the rules.

Rule-based artificial intelligence production systems are known, as are languages which support their construction. Reference is given to: Brownston et al. "Programming Expert Systems in OPS5", Addison-Wesley, copyright 1985; Jackson, "Introduction to Expert Systems", Addison-Wesley, copyright 1986; Forgy, "OPS5 User's Manual", CMU-CS-81-135, copyright 1981; and Forgy, "RETE: A Fast Algorithm For the Mini Pattern/Mini Object Pattern Match Problem", *Artificial Intelligence*, Vol. 19, copyright 1982.

Brownston describes a rule-based artificial intelligence production system ("production system") based upon a cycle of three states including matching-rule, select-rule, execute-rule. Brownston points out that the matching of elements to rules is the primary inefficiency in the operation of a production system. The speed of the inference engine of any such system is enhanced by a reduction in the matching phase of the operation.

The matching phase in a language such as OPS5 is performed by a patterned network which systematizes the association of system elements with the system rules to select which rules are ready for execution. The matching algorithm utilized in OPS5 is called the RETE method. The RETE matching procedure is well known, having been described, for example, in Forgy's *Artificial Intelligence* article. Rules (or "productions" or "production rules") have two parts, the LHS (left-hand side, or if-part) and the RHS (right-hand side, or then-part). Relatedly, a rule can be considered an if-then statement of the form:

If conditions A, B, C are true, then take actions X, Y, Z.

In a production system, the working memory (WM) forms the universal data base of the system. Characteristically, the WM is segmented into classes, the classes consisting of elements, or members, each member being referred to as a class member (CM). Each rule of the rule set has the two parts described above: LHS and RHS. The LHS is a logical expression referring to working memory classes, and the RHS is a list of operations to be performed on CMs.

The inference engine is the control mechanism that selects rules to fire and then executes the actions of the RHS of a selected rule, repeating the cycle. The satisfied rules are called instantiations. An instantiation consists of the rule and list of CMs that satisfy the rule's LHS. The inference engine "fires" an instantiation by executing the RHS of the rule, using the list of CMs in the instantiation. The set of all instantiations available for firing is called the conflict set. The inference engine conducts a procedure called conflict resolution to select the instantiation from the conflict set to fire next. The firing of a rule by execution of its RHS can create, change, or delete elements in WM and lead to changes of the conflict set. The inference engine of a rule-based production system repeatedly executes, in a cycle, the step of recognizing all instantiations in the conflict set, the step of resolving which instantiation of the step to fire, and the set of firing the selected instantiation. The cycle is called the "recognize-act" cycle.

Upon the firing of each rule, the inference engine again determines the conflict set by computing using the RETE algorithm. The RETE algorithm is expressed as a sorting network. The LHS conditions of all rules in the rule set are compiled into a sorting network including nodes, most of which are associated with tests. Use of the network to recognize instantiations is called "RETE" or "match" processing. In RETE processing, tokens are passed through the network. Tokens that traverse through the network represent instantiations in or for the conflict set. RETE processing is computationally expensive, amplifying the importance of production system techniques that reduce it.

Early rule-based production systems supported only a fixed sequence of actions in the RHS of a rule. This restriction led to very short RHSs. This rudimentary form of the RHS resulted in rules which rarely would make more than one change to the same CM during one firing. The increasing use of high-level procedural language techniques for writing rules has led to the incorporation of procedures such as subroutines, functions, and coroutines in rule RHSs. In these cases, during the execution of a rule RHS where a high-level procedural language is used, the execution of a procedure, and the nesting of these frequently result in repeated changes to a single CM in the execution of one RHS. As an example, suppose that in executing a RHS, a subroutine is called. It is asserted that the program language allows for the subroutine to be written using rule-based production system techniques. During execution of the subroutine many rules may fire, and in completing the subroutine's computations, many CMs may be created, changed repeatedly, and then deleted from working memory before return is made to the parent routine and execution proceeds for the RHS that called the subroutine.

Customarily, it is standard to undertake RETE processing immediately upon the making of any change to a CM. Therefore, the computational intensity—and expense—of a production system will only be amplified by elaboration of RHS capability which permits compound actions and supports hierarchical routine execution.

SUMMARY OF THE INVENTION

Classically, RETE processing is undertaken following any change to a CM. Unexpectedly, it was observed by the inventors that changes to class members could be uncoupled from the corresponding RETE processing and delayed. It was found that the delay practiced according to the invention frequently can reduce the total amount of RETE processing.

According to the invention, at the time a change is made to a class member, a control block is created that records the requirement for RETE processing. If another change is made to the same class member prior to execution of the RETE processing, then only one control block is needed to record both changes. Further, the two changes can be united to effect one, possibly larger change. Since the expense of the RETE algorithm is essentially independent of the size of the change, total RETE processing can be substantially reduced by reducing the two previously required passes through the RETE network to one.

A further point observed in the operation of rule-based subroutines is that repeated changes to a class member may cancel each other out completely. Thus, postponement of RETE processing in a calling routine in response to change of a CM in a called routine might obviate the need for any RETE processing for that CM in the calling routine. Meanwhile, in the called routine, RETE processing is attenuated by postponement of RETE processing for the changed CM.

When processing an action which does not call or contain a set of rules, the coalescing of changes will provide an efficiency gain proportional to the number of operations on a given CM. For an action calling or containing a rule set, the efficiency gain can be arbitrarily good. The improvement is proportional to the number of changes to given CMs, but there can be an arbitrarily large number of changes while processing the called or embedded routine.

Accordingly, our invention is a method for coalescing changes to objects (CMs) in a working memory, the method being invoked prior to processing these changes through a working memory matching structure used in conflict set resolution, where such resolution occurs during the pattern match, rule select, rule execute cycle of a rule-based artificial intelligence production system. The production system includes a memory for storing rules, and an inference engine cooperating with the working memory and the memory for storing the rules for executing each cycle, each rule having pattern indication and action specifying parts, the action specifying part of a rule including procedures for effecting changes to working memory objects. The method includes the steps of:

responsive to a first change to an object resulting from execution of a first rule, creating a control block (CB) internal to the inference engine and recording that first change in the created control block (CB);

enqueueing the control block;

in the event of a second change subsequent to the first change to the working memory object prior to selection of the next rule following the first rule, coalescing the net effect of the first and second changes in the queued control block; and upon completing execution of the first rule, passing the change recited in the control block through the matching mechanism.

This method reduces match processing, with the reduction magnified by the degree of nesting of rules and commonality of referencing to working memory objects by the pattern indication portion of the rules.

It is therefore an object of this invention to reduce the amount of match processing required in a rule-based artificial intelligence production system.

It is a further object of this invention to postpone conduction of all matching procedures in a rule-based artificial intelligence production system until the completion of a recognize-act cycle, while accumulating and uniting changes made to working memory objects during that recognize-act cycle.

Other objects and attendant advantages of this invention will become evident when the following detailed description is read with reference to the drawings.

DESCRIPTION OF THE PREFERRED EMBODIMENT

In the specification, the terms "make" and "create", "modify" and "update", "remove" and "delete", and "class member", "working memory element", and "object" are used interchangeably. Further, the inference engine of a rule-based artificial intelligence production system includes a looping control mechanism termed the "recognize-act cycle" whose fundamental operational cycle includes the sequence match, select, execute. See, for example, the Brownston reference at pp. 4-9.

Figure 1:
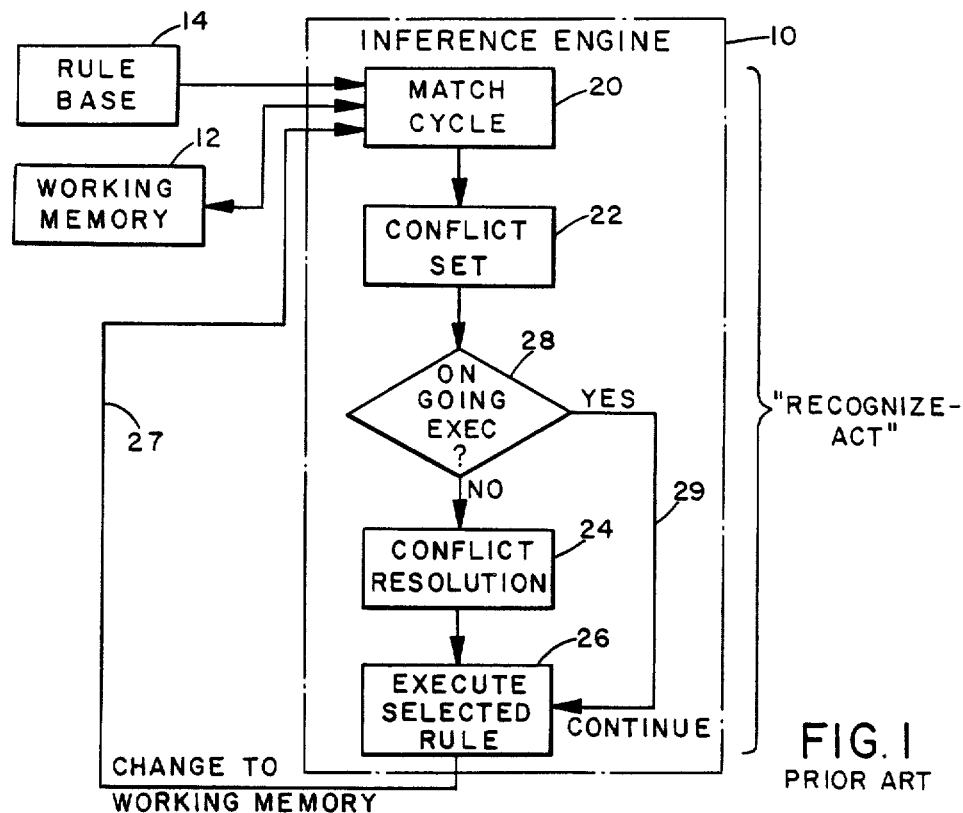
FIG. 1 is a procedural flow diagram illustrating the essential sequence of steps in the prior art, recognize-act cycle of a rule-based production system.

In the prior art represented by FIG. 1; a rule-based production system (production system) includes an inference engine 10, a working memory 12, and a rule memory or rule base 14. The structures, interconnections, and functions of these elements are well explained in the prior art references cited above. In the production system of FIG. 1, a set of rules in the rule base 14 is presented to a computer (not shown) in the form of an application program written in a language such as OPS5 (adapted for production system operation). The rules apply to objects in the working memory 12 which represent things or facts upon which the production system operates. The inference engine 10 relates the set of rules to the objects in working memory to determine the set of all rules whose conditional (LHS) portions are satisfied by objects in working memory. Preferably, this matching is accomplished by means of a matching procedure based upon an ordered structure, such as a RETE network. The RETE network for each rule is established when the application program is compiled. Hereinafter, this matching process will be synonymous with "RETE processing". Parenthetically, it is asserted that structures and procedures other than RETE networks can be used for matching. In this regard, vectors, lists, schemas, and frames are all matching constructs utilized in prior art production systems for relating working memory objects with the conditional parts of rules.

The matching procedure of an inference engine produces a conflict set, consisting of a set of rules all of whose conditional parts are satisfied by objects in the working memory. The inference engine selects for execution one rule from the conflict set, and executes the selected rule. Rule execution involves taking the specific action or actions enumerated in the RHS of the selected rule. Most frequently, execution of the rule requires modification or creation of working memory objects. In an OPS5-based production system, for example, rule execution adds, modifies, or deletes one or more memory elements in the working memory. In this description, addition, modification, and deletion are all considered to "change" a working memory object. Thus, if an object is made, updated, or deleted by execution of a rule, the object is considered to be "changed".

In FIG. 1, the recognize-act cycle of the inference engine is understood in greater detail to include a match cycle 20 which develops a conflict set of rule instantiations 22, following which a conflict resolution step 24 selects one of the conflict set instantiations for execution ("firing"). In step 26 of the recognize-act cycle, the selected rule is executed, usually resulting in changes to working memory objects, represented by the line 27 originating at the execute step 26 and terminating at the match cycle 20, indicating the match processing that follows a change to working memory.

As pointed out on page 230 of Brownston et al., the prior art inference engine 10 will conduct a match cycle in response to *each* working memory change resulting from rule execution. Thus, several match cycles may be conducted during the execution of the single rule. The RETE processing required during the match cycle is expensive and time consuming. Therefore, any reduction in such processing will enhance the effectiveness, efficiency, and value of a production system.

In FIG. 1, the potential for conducting multiple match cycle steps 20 is represented by the decision block 28. In this regard, assume that the production system of FIG. 1 has been initialized, and an initial match cycle conducted resulting in an initial conflict set prior to the firing of the first rule. In this case, the negative exit will be taken from decision block 28, and a rule will be selected in step 24 and fired in 26. Now assume that the rule being executed results in a change to a working memory object before all of the actions specified in the RHS of the selected rule have been completed. The working memory object change is recognized, and, as represented by line 27, the match cycle is conducted, the conflict set is updated, and the positive exit 29 is taken from the decision 28, permitting execution of the selected rule to continue. Here, it is asserted that the decision block 28 is meant to represent an implicit feature of the inference engine of FIG. 1, and may be undetectable in the code. Nevertheless, each working memory change resulting from the execution of the selected rule will result in the match cycle being performed, even if rule execution has not completed.

Figure 2:
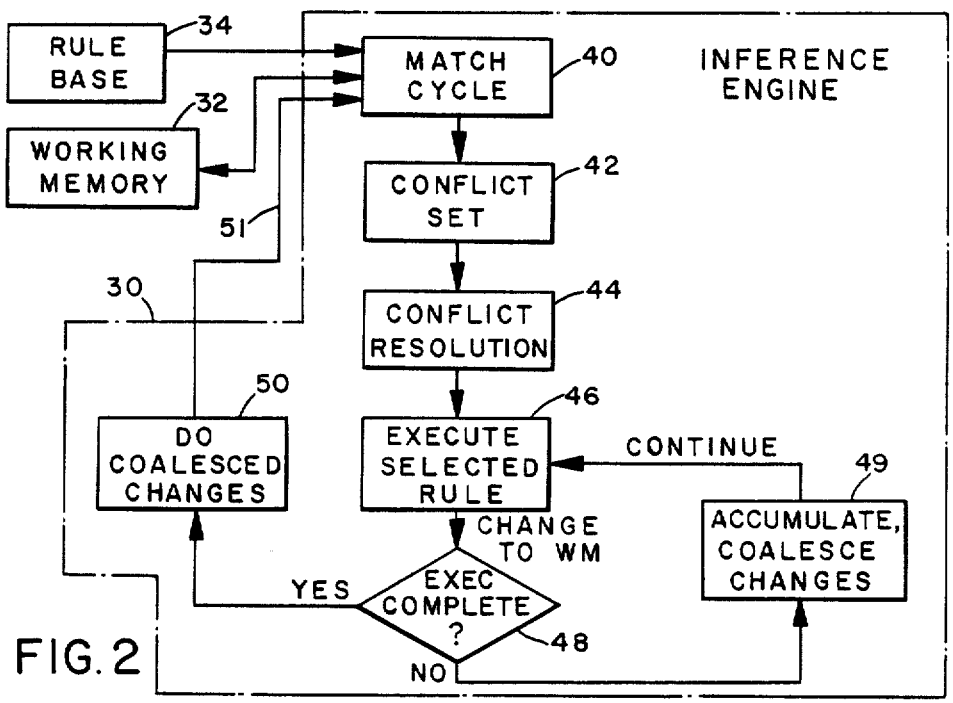
FIG. 2 is a flow diagram illustrating the procedural sequence of a recognized-act cycle according to the invention.

FIG. 2 is a conceptual illustration of how an inference engine constructed using the teachings of this application can be distinguished in its operation from the prior art inference machine of FIG. 1. In FIG. 2, a rule-based production system incorporating the invention described below includes an inference engine 30, a working memory (WM) 32, and a rule base (RB) 34. A matching construct of the form of a compiled RETE network is indicated by reference numeral 40. The match construct 40 produces a conflict set 42 of instantiations, and a conflict resolution procedure 44 selects one of the conflict set 42 for firing. The rule selected in step 44 is executed in step 46. A decision 48, implicit to the execution step 46, responds to changes to working memory objects by asking whether the execution step is completed. If not, step 49 accumulates and coalesces the changes to working memory objects while the execution of the selected rule proceeds. When the execution of the rule is complete, the positive exit is taken from decision 48, the accumulated coalesced changes are introduced to the working memory 32 by performing the matching step 40. Again, as with FIG. 1, the decision 48 is representational and corresponds to the postponement of RETE processing to alter the conflict set 42 in response to the coalesced changes made during the execution of the last-selected rule. Although the matching step 40 is implicit for each working memory object which is changed, the advantage of the inference engine illustrated in FIG. 2 is that multiple changes to a single working memory object will require now only a single response by the matching step 40. In contrast, in the inference engine of FIG. 1, if, for example, two successive modifications were made to the same object, each change would initiate a match cycle. However, in the inference engine 30 of FIG. 2, successive changes to the same data objects are coalesced, with the result that the match cycle is undertaken only once for the changed working memory object. It is to be understood, further, that the inference engine 30 has the capability to coalesce changes and postpone change processing for each object changed in execution of the selected rule.

In its industrial embodiment, the invention assumes the existence of appropriate computer system hardware which can be programmed with an application defining a rule-based production system. The rules of the production system are compiled into a RETE network structure for constructing and updating a conflict set of rules whose left hand sides are satisfied by working memory objects.

In the description which follows, the working memory objects are segregated into classes, with the objects in a class referred to as class members (CMs). According to our invention, whenever, in the course of rule execution, a class member is changed, the indicated actions are taken, in that the object is changed, but the corresponding match processing is delayed. The requirement for match processing is recorded by the creation of a control block. If additional changes are made to the class member during execution, then no additional control block is created. The first control block suffices to reflect the net of all the accumulated changes. In this regard, it is said that the first control block "coalesces" the accumulated changes to a class member during execution of a selected rule.

For example, assume that the execution of a rule requires, first, creation of a CM. This change is memorialized in the creation of a CB, and the CM is "made". However, as rule execution is not complete, no RETE processing is done in response to the "make". The CB is enqueued in a "make" queue. Next, assume the CM is updated by changing one of its attributes. The second change is undertaken by altering the attribute. Now, however, no additional CB is created. Instead, when rule execution is complete, the "make" CB results in the *updated* CM being RETE processed. In this respect, the "make" CB suffices to signify the "make" and "update" changes, and its existence has "coalesced" the changes in its single self. Now, only a single "make" RETE process is required to match the updated CM with the rule base. In the prior art, a "make" RETE process would have been conducted at the creation of the CM, followed by an "update" RETE process when the CM was changed. Thus, the invention, in this example, reduces the RETE processing by half.

In our invention, control objects are declared when the application containing the production system is compiled. It is understood that the objects in the working memory are segregated into classes. Each class is defined by a class anchor. At initialization of the application, the following declaration specifies the class anchor (CA) where "/*" on any line delimits a comment:

| Declare CA, | |
|---|---|
| top_RTSB_pointer, | /* points to top RTSB in a stack of RTSBs |
| CCB_stack_pointer, | /* points to Cared-for Class queue |
| first_CM_pointer, | /* points to first class member in queue |
| last_CM_pointer, | /* points to last class member in queue |

Each class member (CM) has a header (CMH) which is permanently associated with its class member. The CMH is created and initialized with its CM. The address of the CM immediately yields the address of the CMH, and vice versa. Specifically, the following define the CMH:

| Declare CMH, | /* declaration of a class member header |
|---|---|
| CA_pointer, | /* points to the anchor for the class of CM |
| HISTORY_stack_pointer; | /* points to the history stack of CHBs for CM |

A control block termed a run-time stack block (RTSB) satisfies the following declaration:

| Declaration RTSB, | |
|---|---|
| next_RTSB_pointer, | /* points to next RTSB in stack |
| CCB_queue_pointer, | /* points to Cared-for Classes queue |
| MAKE_queue_pointer, | /* points to first CHB of type 'make' |
| UPDATE_queue_pointer, | /* points to first CHB of type 'update' |
| CHANGED_queue-pointer; | /* points to first CHB of typed 'changed' |

Change information regarding a CM is recorded in a change block (CHB). The CHBs are the control blocks which coalesce changes to class members. A change block is given by:

| Declare CHB, | /* change block declaration |
|---|---|
| type | /* 'make, 'update', or 'changed' |
| RTSB_pointer, | /* points to RTSB |
| CM_pointer, | /* provides access to CM and CMH |
| RTSB_next_pointer, | /* next CHB in queue off RTSB |
| RTSB_prev_pointer, | /* previous CHB in queue off RTSB |
| HISTORY_stack_next; | /* next CHB in stack (HISTORY stack) off CMH |

Next, a control object termed a run-time stack "cares" block (RCB) is declared by:

| Declare RCB, | |
|---|---|
| next_RCB_in_stack; | /* points to next RCB in RTSB Cares stack off CA |
| RTSB_pointer; | /* points to an RTSB that cares about class |

Last, an entity called a care-for class block (CCB) is declared by:

| Declare CCB, | |
|---|---|
| next_CCB_pointer, | /* points to next CCB in queue |
| CA_pointer; | /* points to anchor of a class that cares |

All of the just-defined objects are understood to comprise addressable locations in storage, which are designated by well-known syntactic elements called "pointers".

If a rule RHS includes a call to a subroutine, function, or coroutine, these control entities enable the application to coalesce CM changes made during a call so that the calling routine will be enabled to process these changes. At the time a change is made to a CM, a CHB is created that records the fact of required RETE processing. If another change is made to the same CM before the RETE processing is executed, then only one CHB is needed to record both changes. During a subroutine, a CM can be created, altered, and then destroyed before a return to the calling routine occurs. By the time the flow of control returns to the caller, there is no trace of the CM. The invention enables RETE processing for the calling routine to be delayed until control returns to the caller. To simplify the portion of the discussion which follows, a definition is adopted. If a routine has a rule whose LHS mentions a class, then the RETE algorithm for that routine must process all changes to members of that class before conflict resolution for that routine can be done. In this case, it is said that the RETE network for the routine "cares about" the class if some LHS in the routine mentions the class.

Figure 3:
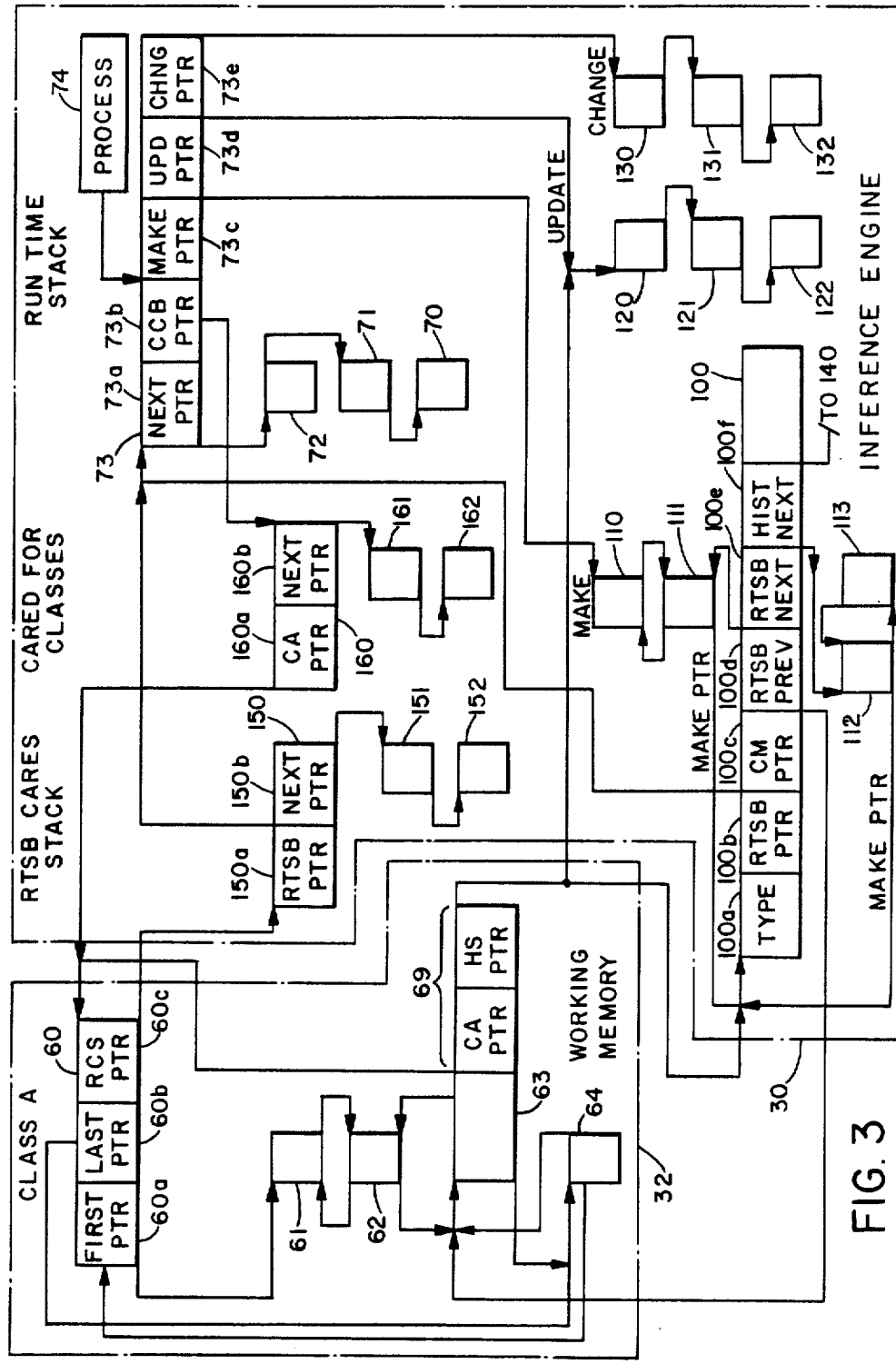
FIG. 3 is an illustration showing the set of control structures and control structure interconnections required for practice of the invention.

In FIG. 3, the interconnections between the control objects necessary for the practice of this invention are illustrated. In FIG. 3, the working memory 32 includes a set of objects, separated into classes, one class of which is termed class A. A CA 60 anchors a doubly-linked circular queue consisting of all of the CMs included in class A. The queue of class A include CMs 61–64. CA 60 includes at least three fields 60a, 60b, and 60c, each including a pointer. Field 60a includes a pointer to the first CM 61 of class A. The field 60b points to the last CM 64, while the field 60c points to the top RCB in a queue entitled the RTSB CARES stack.

Each of the CMs 61–64 includes a class member header (CMH). The CMH of CM 63 is indicated by reference numeral 69. The CMH 69 has a pointer (CA PTR) to the CA 60 for the class A. The CMH 69 also has a pointer (HS PTR) to a "HISTORY" stack of CHBs for CM 63. It is understood that the detailed structure illustrated for CM 63 describes also the structure of the CMs 61–64, and every CM in the working memory 32. Thus, every CM has a pointer to its own private HISTORY stack, and every class anchor has a pointer to its own private RTSB CARES stack.

In FIG. 3, it is presumed that the production system has a hierarchical structure in that the RHS of any rule can contain a "call" to a subordinate routine or function. The subordinate routine is considered to be on a lower level of the hierarchy than the calling routine. In FIG. 3, a stack termed the "RUN-TIME STACK" is a linked list of data blocks which is pushed when a subroutine is called and popped when the subroutine returns to the caller. The blocks in this stack are the RTSBs. The run-time stack of FIG. 3 includes four RTSBs 70-73. The RTSB 70 is the RTSB of the primary routine, that is the one first called in the hierarchy. The routine owning RTSB 70 has called a routine owning RTSB 71, which, in turn has called a routine owning RTSB 72. The routine owning RTSB 72 has called the routine "PROCESS" 74 which owns the RTSB 73. The RTSB 73 has a structure which is identical with the structures of RTSBs 70-72. The RTSB 73 points to the next RTSB (72) by a pointer (NEXT PTR) $73a$. The field $73b$ contains a pointer (CCB PTR) to a CARED-FOR CLASSES stack. Last, are three pointers $73c$, $73d$, and $73e$, which point, respectively, to a MAKE stack, an UPDATE stack, and a CHANGED stack.

The MAKE, UPDATE, and CHANGED stacks are queues in which control blocks are stored that record requirements for RETE processing. The control blocks in these queues are referred to as changed blocks (CHBs). The MAKE, UPDATE, and CHANGED queues are conventional linked lists whose members are connected by pointers. For example, the MAKE stack includes CHBs 110, 111, and 100. The UPDATE stack includes CHBs 120-122, and the CHANGED stack includes CHBs 130-132. Each RTSB has its own set of these queues, and does not share them with any other RTSB.

A CHB can be any one of three types: "make", "update", or "changed". A record that a "make" must be pushed through the RETE algorithm is kept with a "make" CHB; a record of an "update" is kept in an "update" CHB; and a record that the class member was changed and that the appropriate RETE processing has been completed is kept in a "changed" CHB. Exemplary of the CHBs in the MAKE, UPDATE, and CHANGED stacks is the CHB 100 having fields $100a$-$100f$. The field $100a$ contains a code (TYPE) that indicates which type of CHB this one is. For example, field $100a$ of the CHB 100 will contain a code indicating that it is of the "make" type. A pointer to the RTSB which owns this CHB is in field $100b$. In this case, the CHB is owned by the RTSB 73. Next, the CM to which this CHB pertains is pointed by a class member pointer (CM PTR) in field $100c$. The previous and next CHBs in the MAKE queue off of the RTSB 73 are pointed to by fields $100b$ and $100e$, respectively. Last, it is asserted that the CM PTR field of each CHB associates each CHB with one, and only one, CM in the working memory 32. Further, a HISTORY queue is maintained for each CM to which the CHBs of the CM belong. Thus, each CHB belongs to two queues: the MAKE, UPDATE, or CHANGED stack of the RTSB owning the CHB, and to the HISTORY stack of the one CM with which it is associated. In FIG. 3, the CHB 100 is thus a member of the MAKE stack linked to the RTSB 73, and also a member of the HISTORY stack for the CM 63. The HISTORY stack of the CM 63 consists of the CHB 100 and CHBs 140 and 141.

Coalescing of changes to working memory objects can be further understood with reference to the MAKE, UPDATE, and CHANGED queues and the CHB of FIG. 3. In the embodiment being discussed, if the CM is removed, then the "removed" RETE processing is done immediately (ignoring any earlier changes that are pending and recorded in CHBs). Thereafter, all CHBs for the removed CM are destroyed. Thus, there are no "removed" CHBs and no "removed" queues off of RTSBs. Recalling the example given above regarding making and subsequently updating a CM, if the make of the CM is indicated by creation and enqueing of a "make" CHB for the top RTSB on the RUN-TIME stack, the subsequent alteration of the CM does not require creation of an "update" CHB. Further, no additional change is made to the "make" CHB. Likewise, if a CM currently existing when a rule is executed is updated by the currently-executing routine and "update" CHB for the top RTSB is created and placed in the UPDATE queue RTSB and the history stack of the CM. If that class member is changed again during the current execution, the created "update" CHB records alteration to the CM, and no change is required for the CHB, nor is creation of a new "update" CHB required. These two facts plus the handling of the "removed" described above are the features that "coalesce" changes to CMs.

A "changed" CHB enqueued off of the top RTSB records that the pointed-to CM was previously either created or altered during the currently executing routine and that the RETE processing for these earlier changes was completed. When the prior RETE processing was completed, the previous CHB was removed from its make or update queue, the TYPE field was altered to "changed" and the CHB was inserted into the CHANGED queue. If the CM is changed again, the CHB is removed from the CHANGED queue off the top RTSB and the CHB is inserted into the UPDATE queue for the same RTSB. Concurrently, its TYPE field is changed to "update". This reflects that additional RETE processing now needs to be done.

The HISTORY stack for a CM contains every CHB built for the CM. Thus, the HISTORY stack of the CM may contain different CHBs for different RTSBs. When a HISTORY stack contains multiple CHBs, they will be enqueued off of different RTSBs, giving the HISTORY stack of CHBs a one-to-one correspondence with a subset of the RTSBs on the RUN-TIME stack. This one-to-one correspondence preserves order between the RUN-TIME and HISTORY stacks. The RTSBs that correspond to CHBs on the HISTORY stacks are a subset of those RTSBs whose routines "care about" the class in which the CM is contained. However, the CHB HISTORY stack for a CM may not have a complete list of all the routines which care about the class of the CM. For example, suppose the RETE network of routine X cares about class A, and X calls routine Y, and a member of class A is created in Y. While execution remains in Y, there is no history of the new class member in routine X's RETE network and there is no CHB for the new class member enqueued off of the RTSB of routine X. When routine Y returns to routine X, it could be determined (for example by searching) if routine X's RETE network does indeed care about the new class member. However, in the invention, the RTSB CARES stack enqueued off of the class pointer record which RTSBs "care about" that class. Thus, when routine Y returns to routine X, the fact that the RETE network of routine X does contain reference to class A can be determined quickly by "walking" the RTSB CARES stack of class A.

The RCS PTR in field $60c$ of the class anchor 60 points to the top block in the RTSB CARES stack for class A. RCBs are in the RTSB CARES stack. Whenever the RUN-TIME stack is pushed (that is, whenever a subroutine is called), if the RETE network for that subroutine cares about a class, then the RTSB CARES stack is also pushed by addition of an RCB to the top of that stack, pointing to a new RTSB. In this regard, the RTSB CARES stack for class A consists of link-listed RCBs 150–152. Each RCB includes at least two pointer fields, corresponding to the field 150a and 150b of the RCB 150. In field 150a is a pointer to the RTSB of a routine which cares about class A. In field 150b is a pointer to the next RCB in the RTSB CARES stack.

As stated above, calling a routine results in pushing a RTSB onto the RUN-TIME stack, and an RCB onto the RTSB CARES stack for each class that the called routine cares about. Fast access to all of the classes that the routine cares about is provided in the CARED-FOR CLASSES stack. In FIG. 3, this stack includes CCBs 160–162. Each CCB in this stack includes at least two fields corresponding to fields 160a and 160b of block 160. The first field includes a pointer (CA PTR) to the class anchor of one of the classes cared for by the called routine. The second field points to the next CCB (NEXT) in the stack.

In the discussion of FIG. 3, the terms "list", "queue" and "stack", have been used interchangeably to indicate linked sequences of blocks. Some of these sequences have an order corresponding to the hierarchy of routines in the production system application. It is asserted that all of these sequences are generated using conventional means at initialization time for the application, and that they are processed using conventional routines during execution of the application. The invention is not an invention of lists, queues, or stacks, but rather relies upon these well-known structures for its practice.

The practice of the invention is not limited to production systems which use routine calls in RHS execution. In its simplest application, the invention is useful in production system applications which may not use calls but which do recognize and execute compound RHSs. In this, the simplest case, the structure of FIG. 3 would illustrate a single RTSB and a CARED-FOR CLASSES stack pointing to all classes of the working memory and an RTSB CARES stack with a single RCB pointing to the single RTSB. In this fundamental utilization, MAKE, UPDATE, and CHANGED queues would still serve to, for each rule execution, coalesce changes and defer changes until completion of execution.

However, when the invention is applied in a production system supporting RHS calls to subroutines, a set of assumptions are made. First, if any routine in a hierarchy of routines has a rule whose LHS mentions a class, then the RETE algorithm for that routine must process all changes to CMs of that class before conflict resolution before the routine can be done. In this respect, it is said that the RETE network for this routine "cares about" the class if some LHS in the rule base for the routine mentions the class. With this, the following assumptions apply to the routines:

1. Each routine has its own, separate RETE network.
2. There is a separate conflict set that is created when a routine is called, and deleted when the routine returns to its caller.
3. Recursive calls to a subroutine of data-driven rules will only be supported by creating additional RETE networks for the called routine, one network for each level of nesting of the routine.
4. The run-time stack is pushed when a routine is called and popped when the routine is returned.
5. When a routine is called, upon entry into the routine, the RETE network for the called routine must process all members of all classes that the RETE network of the routine cares about, the processing being done as "makes" for all CMs of the cared-for classes. When the routine is exited, the routine's RETE network is flushed by "removing" every number of every class that the RETE network cares about.

Utilizing the control block and control block connections of FIG. 3, the method of coalescing changes according to the invention can be described in more detail.

When a class member is created, a "make" CHB is also created. The CHB is enqueued in the MAKE queue off of the top RTSB in the RUN-TIME stack. The CHB is also pushed onto the HISTORY stack anchored in the CMH of the class member created. If additional changes to the CM precede conflict resolution for the routine, then those changes are coalesced into the make operation, and nothing further is done to the CHB until the made CM is subjected to RETE processing.

When conflict resolution is required, the MAKE queue of the top RTSB is walked. In this regard, the MAKE queue is traversed in order from top to bottom, with the "make" of each CM having a CHB in the queue being pushed through the RETE network. Each time the CM linked to a CHB in the MAKE queue is subjected to a match cycle, the CHB is moved from the MAKE to the CHANGED queue.

If a CM is removed, then the RETE processing for removal is done immediately for all active routines caring about the class of the class member and having RTSBs on the run-time stack. All CHBs for the class member are removed from their respective queues and destroyed. If creation or changes occurred before the remove request, but after the proceeding conflict resolution step, all RETE processing for the creation and/or updating is avoided.

If multiple changes are made in succession to an already existing CM, then the already existing CHB for that CM is moved for the first change from the CHANGED queue to the UPDATE queue, with the appropriate change being made to the TYPE field of the CHB. No CHB modifications need occur for those changes made after the first update to the CM. When conflict resolution is finally required to proceed to the next rule to be fired, the UPDATE queue is first walked, the "update" RETE processing done for each CM changed in a respective match cycle, and the CHBs are all moved back to the CHANGED queue.

The CHANGED queue is maintained principally to ensure that termination of a routine will not prevent coalesced changes being passed back to the caller for processing in the caller's RETE network. Suppose routine X called routine Y and that routine Y has run to completion. Now, the flow of control returns from routine Y to routine X. More specifically, the RHS of some rule (say rule RR) in routine X which contained the call to routine Y now must complete execution. Other actions can occur subsequent to the return, but before execution of rule RR is complete and RETE processing initiated in order to begin conflict resolution. For example, the call may be to routine Y in a loop where it would be repeated many times. Advantage is gained through the practice of the invention if the changes made to class members that routine X cares about are not immediately processed by routine X's RETE algorithm. Instead, the invention coalesces changes made in routine Y with changes made earlier in routine X.

Coalescing upon return to a calling routine is done by walking each of the MAKE, UPDATE, and CHANGED queues off of the called routine's RTSB. Given a CHB in one of routine Y's MAKE, UPDATE or CHANGED queues, if that CHB is the only CHB in the related CM's HISTORY stack, then the CM must have been created inside routine Y (or in a routine called by routine Y). In this case, speedy determination can be made as to whether routine X cares about this new CM by looking at the RTSB Cares stack for the CM's class anchor. If routine X cares about the class containing the newly made CM, the CHB goes into the MAKE queue for routine X. Similarly, if a routine hierarchically positioned between routine Y and routine X cares about the class, the CHB goes onto that routine's MAKE queue. Otherwise, the CHB is destroyed.

If the CHB is not the only CHB on the CM's HISTORY stack, then either the next older CHB is associated with routine X or it is associated with the routine that is hierarchically positioned between routine X and routine Y. That is, the routine is positioned before X but after Y on the call chain. Which possibility is easily determined by comparing the RTSB PTR in the CHB with the address of routine X's RTSB. If routine X cares about the class containing the CM, then there must be a CHB queued off of routine X's RTSB because of the assumption that all members and all classes that routine X cares about would be created (pushed through routine X's RETE network as new CMs) when routine X was called. If there is a CHB enqueued for routine X, then it is necessary only to move back the CHB to routine X's UPDATE queue if it was formerly on routine X's CHANGED queue. Likewise, if there is a CHB enqueued for a RTSB below X on the RUN-TIME stack, then the CHB in its CHANGED queue needs to be moved to the routines UPDATE queue. In all cases, the HISTORY stack is popped to eliminate the CHB for routine Y.

When routine Y returns to routine X, the RUN-TIME stack is popped, and, concurrently, the CARED-FOR-CLASSES queue is walked to quickly locate each class anchor that routine Y cares about. For each of these routines, RTSB CARES stack is popped to remove the RCB pointing the popped RTSB for each such class anchor.

When routine X calls routine Y, the reverse steps are taken. The RUN-TIME stack is pushed. The CARED-FOR-CLASSES queue is walked, and for each class CCB, two actions are taken for the designated class anchor. First, the RTSB CARES stack is pushed with a new RCB pointing to the RTSB pushed on to the RUN-TIME stack. Second, each queue of CARED-FOR-CLASSES is walked to create the CMs used by routine Y and each HISTORY stack is pushed with the new CHB in that stack also being enqueued in the RTSB's MAKE queue.

Figure 4:
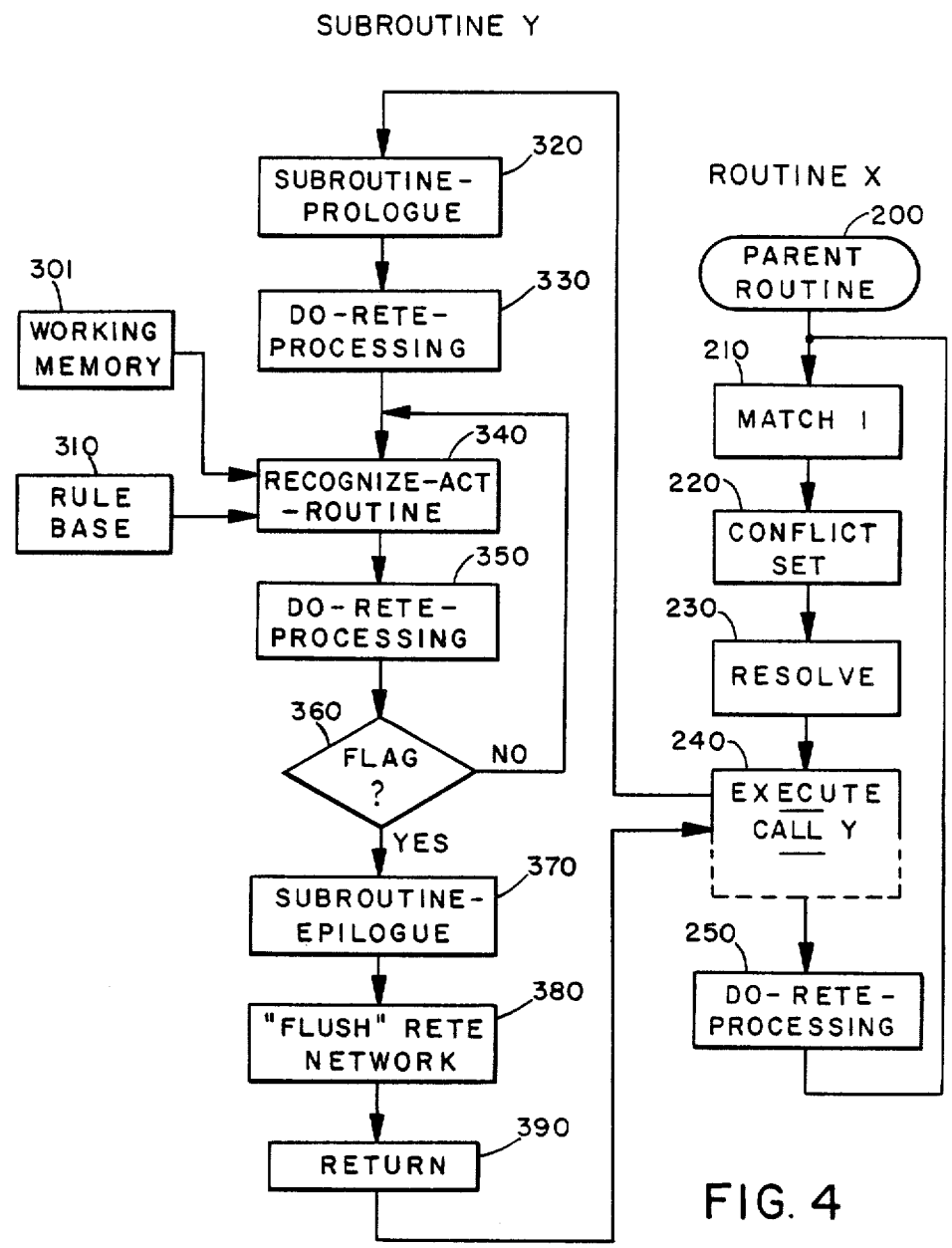
FIG. 4 is a flow diagram illustrating the procedural sequence of the invention in a rule-based production system in which routine calls are made during rule execution.

The operating procedure just described is illustrated in FIG. 4 where routine X is embodied in a parent routine 200 implementing a recognized-act cycle including process steps 210, 220, 230, 240, and 250, in sequence. RETE processing is implemented in the MATCH step 210 and to produce the conflict set 220. A rule to fire is selected in RESOLVE step 230 and the rule is executed in step 240 by executing the instantiation selected in step 230. During the course of executing the instantiation, the application code will initiate changes to working memory objects which are made, updated, or removed as part of rule execution. In addition, the course of execution may include a call (call Y) to subroutine Y. Assuming no call to routine Y or return of control from Y, the match and conflict set steps 210 and 220 are preceded by a call to a routine 250 entitled do_RETE_processing.

The routine do_RETE_processing is illustrated in Table I. In Table I, the routine, for each CHB in the routine RTSB's UPDATE queue calls the RETE processing of steps 210 and 220 with the RETE network of the top RTSB and the CM pointed to by the CHB and a command to perform UPDATE processing as parameters. Next, the CHB is moved to the CHANGED queue and its type is set to CHANGED. Then, for each CHB in the MAKE queue, the RETE processing routine of steps 210 and 220 is called using the RETE network of the top RTSB, the CM pointed to by the CHB, and the MAKE routine as parameters. Next, the CHB is moved to the CHANGED queue and its type is set to CHANGED.

Following the CALL Y from the execute step 240 in FIG. 4, the production system routine for subroutine Y is entered. Upon entry into subroutine Y, step 320 is invoked. Step 320 consists of a called routine subroutine_prologue, and is followed by the do_RETE_ processing routine 330. The subroutine_prologue step 320 is illustrated in greater detail in Table II. Subroutine_prologue is executed as part of the prologue of each called data-driven routine in the production system. The primary function is to invoke RETE processing for all members of classes that the routine cares about and to push all the stacks needed for coalescing changes. When this routine is complete it returns to the called routine which then calls the recognize-act cycle.

As Table II illustrates, an RTSB for the routine is built and pushed onto the RUN-TIME stack. A new RCB is created and pushed onto the RTSB CARES stack for each CA specified by the CARED-FOR-CLASSES queue of the routine. Then, for each CM in the queue of class members off of the CA specified by a CCB in routine Y's CARED-FOR-CLASSES queue, a new CHB is created, pushed onto the HISTORY stack for the associated CM and enqueued on the MAKE queue off of the routines RTSB. The subroutine_ prologue routine then calls the do_RETE_processing routine of Table I to process all of the "makes" in routine Y's MAKE queue. In this manner, Y's RETE network is initialized with all CMs from WM 301 about which Y cares. This is required to initiate production system processing by subroutine Y.

Next, subroutine Y begins its production system operation by calling a recognize_act_routine 340, illustrated in greater detail in Table III. The recognize_act_routine assumes that the application sets a flag to indicate when routine is to be passed to the caller, routine X. Such a flag can take the form of a control element such as is used in OPS5 programming. The routine of Table III initially selects a rule to execute, and then, assuming there is an instantiation to fire, fires the instantiation. Execution of the rule in subroutine Y is carried out by the application code which will take actions to make, update, and remove CMs during execution. Flag, or control element processing is also carried out by the application during rule execution in order to inform the application when to return control to the caller of subroutine Y.

During rule execution, the recognize_act_routine may be required to execute, update, or remove a CM. If these actions are required, they are taken in conjunction with the respective routines of Tables IV, V, and VI.

Thus, when a new CM is made during the recognize_act_routine 340, the make procedure is performed and the execute_a_make procedure of Table IV is called. The procedure of Table IV records the need for RETE processing of a "made" CM in a CHB. When the CM is made, it is assumed that it contains an indication of the class to which it is to belong. Using this indication, the CA for the class is located, the CA is inserted into the class member queue off of the class CA and a make "CHB" is created and initialized for the CM, pushed onto the CM's HISTORY stack and inserted into the MAKE queue off of the top RTSB.

When an existing class member is changed by updating, the change is made and the execute_and_update procedure of Table V is called. Recall that, under the earlier description, if a routine is currently executing and cares about a class, then for each CM in the class there must exist a CHB in the MAKE, UPDATE, or CHANGED queues of the routine. Thus it is known that a CHB must exist in one of these three queues at the time the function of Table V is invoked. Furthermore, if the located CHB is not in the CHANGED queue, then the need for RETE processing is already recorded, this change is thereby coalesced with the already recorded change, and there is nothing more to do.

In this embodiment, "remove" processing is not implemented by the CB strategy. While "remove" could be enqueued with the hope that a later "make" could be coalesced with a given "remove" to reduce total processing, our embodiment preferably eliminates all traces of a CM as soon as the application requests a "remove" operation. Thus, CHBs are not enqueued for "removes".

When a "remove" is performed, the execute_a_remove procedure of Table VI is called, the CHB in the UPDATE or CHANGED queues are located, the CM is removed, the CHB is dequeued from the MAKE, UPDATE, or CHANGED queue of the current RTSB and the CHB is popped off the CM's HISTORY stack and destroyed. Last, the CM is destroyed and the routine ends.

Returning to the recognize_act_routine of Table II, when the selected instantiation has completed firing, the do_RETE_processing routine (Table I) is called in step 350. When the RETE processing of step 350 is completed, if the return flag has not been set, (step 360), the recognized_act_routine is performed again in step 340. If the flag has been set, the subroutine_epilogue of step 370 is called.

The subroutine_epilogue is illustrated in Table VII, and is executed as part of termination of each routine, including subroutine Y. The epilogue pops the top RCB off of the RTSB CARES stack for each class listed in the CCB for the current RTSB. Then, for each CHB on the MAKE, UPDATE, and CHANGED queues pointed to by the top RTSB, the CHB is popped out of the HISTORY stack for its associated CM and dequeued from its RTSB queue. If the HISTORY stack for the CM is empty and the RTSB CARES stack for the CM's class is not empty, the CHB is changed to a MAKE and placed on the MAKE queue of the RTSB specified by the top RTSB on the RTSB CARES stack of the class. Otherwise, the top CHB on the HISTORY stack is converted to a CHANGED CHB and moved to the UPDATE queue for RTSB specified by the RCB on the classes RTSB CARES stack. Then, the CHB is destroyed for this routine the RUN-TIME stack is popped the RETE network for the routine is "flushed" in step 380 by executing a remove for all of the class members in the class WM 301 that Y cares about, and control is returned (step 390) to routine X.

TABLE I

```
do_RETE_processing:
    Do for each CHB in 'update' queue;
        Call RETE processing routine with top RTSB's
            RETE network and CHB's CM and 'update'
            as parameters;
        move CHB to 'changed' queue and set CHB's type to
            'changed';
    End;
    Do for each CHB in 'make' queue;
        Call RETE processing routine with top RTSB's
            RETE network and CHB's CM and 'make'
            as parameters;
        move CHB to 'changed' queue and set CHB's type to
            'changed';
    End;
End do_RETE_processing;
```

TABLE II

```
subroutine_prologue: indentifier of routine is passed parameter;
    push run-time stack, i.e., add and initialize a new RTSB;
    Do for each CCB on Cared-for Classes queue for routine;
        push a new RCB on RTSB cares queue off CA
            specified by CCB with RCB pointing
            to the new RTSB;
        Do for each CM in queue of class members off
            the CA specified by CCB;
            create a CHB for each CM;
            push CHB onto history stack for CM;
            enqueue CHB in 'make' queue off top RTSB;
        End;
    End
    Call do_RETE_processing; /* to process all the 'makes'
End subroutine_prologue;
```

TABLE III

```
recognize_act_routine:
    Do until a flag is set indicating application wants to return
        to caller;
        Call conflict-resolution; /* select the best instantiation
            to fire
        If there is a best instantiation
        Then
            fire the best instantiation;
                /* Note that during the course of firing
                /* the instantiation, the application code
                /* will initiate changes to working memory.
                /* The application code will call
                /* execute_a_make, execute_an_update, and
                /* execute_a_remove as part of its make,
                /* update, and remove actions.
                /* A flag will be set by the application
                /* when the application wants to return to
                /* the caller of the currently active,
                /* data-driven subroutine.
        Else
            Return to the caller of recognize_act_routine;
        Call do_RETE_processing
    End;
    Return to the caller of recognize_act_routine;
End of recognize_act_routine;
```

TABLE IV

```
Execute_a_make: CM is passed parameters;
    use class name or other identifier to locate anchor (CA) for
        class;
    insert CM into class member queue off CA;
    create and initialize a CHB for the CM;
```

TABLE IV-continued

```
push CHB onto history stack off CM;
insert CHB in 'make' queue off top RTSB in run-time stack;
End execute_a_make;
```

TABLE V

```
execute_an_update: CM is passed parameter;
    If the top CHB on CM's History Stack is on 'changed' queue
    Then move CHB to the 'update' queue
        and change type of CHB to 'update';
End execute_an_update;
```

TABLE VI

```
execute_a_remove: CM is passed parameters;
    Do for each CHB on History Stack anchored at CM;
        If CHB is in an 'update' or 'changed' queue
        Then Call RETE processing routine with CHB's RTSB's
            RETE network and CM and 'remove' as parameters;
        dequeue CHB from make, update, or changed queue;
        pop CHB off history stack;
        destroy CHB;
    End;
    destroy CM;
End execute_a_remove
```

TABLE VII

```
subroutine_epilogue:
    Do for each CCB on Cared-for queue off RTSB;
        pop RTSB cares stack for the CA specified by CCB;
    End;
    Do for each CHB on make, update, and changed queues
        off top RTSB;
        pop CHB out of history stack for CM of CHB;
        dequeue CHB from make/update/changed queue;
        If history stack is empty, and RTSB cares stack is not empty
        Then /* pushing a make thru earlier routines in call
            chain */ creates CHB on 'make' queue of RTSB
                specified by top RCB on the RTSB cares stack;
        Else IF top CHB on history stack is 'changed'
            Then move CHB to 'update' queue for same RTSB
                and set CHB's type to 'update';
        destroy the CHB;
    End;
    pop run-time stack;
End subroutine_epilogue;
```

Obviously many modifications and variations in the practice of this invention will occur to the skilled practitioner which do not depart from the spirit and teachings of this description.

We claim:

1. A method for coalescing changes to objects in a working memory, the method being invoked prior to processing said changes through a matching structure used in conflict set resolution, said resolution occurring during the recognize-act cycle of a rule-based, artificial intelligence production system, said system including a rule set and an inference engine cooperating with said rule set and working memory for executing a succession of recognize-act cycles, each rule having pattern indication and action specifying parts thereof, the action specifying part of a rule including procedures for effecting changes to said objects, said method comprising the steps of:

responsive to a first change to an object resulting from execution of a first rule, creating a control block (CB) internal to the inference engine and recording said first change in the created CB;

enqueueing said CB in a queue;

in the event of a second change to said object subsequent to said first change and prior to the selection of the next rule following said first rule, maintaining said CB unaltered in said queue, without passing either said first or said second changes through said matching mechanism; and upon completing said execution of said first rule, passing the change recorded in said CB through said matching mechanism.

2. The method of claim 1, wherein said first change is a creation of said object, said enqueueing step including enqueueing said CB in a make queue.

3. The method of claim 1, wherein said first change is an update of said object, said enqueueing step including enqueueing said CB in an update queue.

4. The method of claim 1 wherein said enqueueing step includes enqueueing said CB in either a make or an update queue.

5. The method of claim 4, further including the steps of:

responsive to said passing step, enqueueing said CB in a changed queue; and, then, upon selection of a second rule following said first rule, recording a third change to said object occurring before selection of the next rule following said second rule by moving said CB from said changed queue to said update queue.

6. The method of claim 5 further including the step of:

in the event of a fourth change to said object subsequent to said third change and prior to the selection of the next rule following said second rule, maintaining said CB unaltered in said update queue, without passing either said first or said second changes through said matching mechanism; and upon completing said execution of said second rule, passing the change recorded in said CB through said matching mechanism.

7. A method for coalescing changes to objects in a working memory, the method being invoked prior to processing said changes through a matching structure used in conflict set resolution, said resolution occuring during the recognize-act cycle of a rule-based, artificial intelligence, production system, said system including a rule set and an inference engine cooperating with said rule set and working memory for executing a succession of recognize-act cycles, each rule having a pattern indication and an action specifying part, the action specifying part of the rule including procedures for making changes to said objects, said method including the steps of:

creating a first queue for a production system calling routine, and selecting and executing a first rule during said calling routine;

in an action-specifiying part of said first rule, calling and executing a rule-driven, production system subroutine including a subroutine rule set, a subroutine working memory with working memory objects which said subroutine cares about, and a subroutine matching structure used in subroutine conflict set resolution;

creating a second queue for said subroutine;

responsive to a first change to an object in said subroutine working memory resulting from execution of a rule in said subroutine working set, creating a first control block (CB) for said object and recording said first change in said CB;

enqueueing said first CB in said second queue;

in the event of a second change to said object occurring during the execution of said rule of said subroutine working set, maintaining said first CB unaltered in said second queue, without passing either said first or said second change through said subroutine matching structure;

upon completing said execution of said rule in said subroutine rule set, passing said first and second changes through said subroutine matching mechanism in response to said CB; and after return to said calling routine:

if said calling routine cares about said object, moving said first CB to said first queue if said first queue contains no second CB for said object, and passing said first and second changes through said matching structure;

otherwise, dequeueing and destroying said first CB.

8. The method of claim 7, further including the step of creating a third queue for said calling routine, and if said first queue includes a second CB for said object, moving said second CB from said first to said third queue and passing said first and second changes through said matching structure in response to the inclusion of said second CB in said third queue.

* * * * *